United States Patent [19]

Etzkorn et al.

[11] Patent Number: 5,037,206
[45] Date of Patent: Aug. 6, 1991

[54] OPTICAL POSITION TRANSMITTER HAVING A MOVABLE CODE ELEMENT WITH OPTICAL PATH DIFFERENCE GENERATING STRUCTURE WHICH IS GREATER THAN THE COHERENCE LENGTH OF THE SOURCE

[76] Inventors: Horst Etzkorn, Im Flanzer 1, 7767 Sipplingen; Roland Hauck, Im Rosenhag 2, 7769 Hohenfels - Deutwand, both of Fed. Rep. of Germany

[21] Appl. No.: 381,944

[22] Filed: Jul. 18, 1989

[30] Foreign Application Priority Data

Jul. 27, 1988 [DE] Fed. Rep. of Germany ....... 3825475

[51] Int. Cl.$^5$ .............................................. G01B 9/02
[52] U.S. Cl. .................................. 356/358; 356/356; 250/231.14
[58] Field of Search ............... 356/356, 363, 400, 358; 250/237 G, 231.14, 231.16, 231.18

[56] References Cited

U.S. PATENT DOCUMENTS

| 4,291,976 | 9/1981 | McMahon . | |
|---|---|---|---|
| 4,309,109 | 1/1982 | Blodgett et al. | 356/356 |
| 4,596,466 | 6/1986 | Ulrich | 356/358 |
| 4,636,076 | 1/1987 | Pettigrew | 356/356 |
| 4,829,342 | 5/1989 | Nishimura | 356/356 |

FOREIGN PATENT DOCUMENTS

| 0251632 | 1/1988 | European Pat. Off. . | |
|---|---|---|---|
| 2151709 | 5/1972 | Fed. Rep. of Germany . | |
| 1548707 | 2/1979 | Fed. Rep. of Germany . | |
| 3221621 | 12/1983 | Fed. Rep. of Germany . | |
| 3307639 | 9/1984 | Fed. Rep. of Germany . | |
| 3609507 | 10/1986 | Fed. Rep. of Germany . | |
| 3708145 | 9/1987 | Fed. Rep. of Germany . | |
| 3638455 | 6/1988 | Fed. Rep. of Germany . | |
| 0259404 | 10/1988 | Japan | 356/356 |
| 2185359 | 7/1987 | United Kingdom . | |

OTHER PUBLICATIONS

Paper by D. Hickmann in "Journal of Physics E/Scientific Instruments" Publication by Glomb in Proceedings IEEE/AIAA, 1988; pp. 187–192.

*Primary Examiner*—Samuel Turner
*Attorney, Agent, or Firm*—Lee, Mann, Smith, McWilliams & Sweeney

[57] ABSTRACT

An optical position transmitter comprises a movable code element (36). A light beam (44) is directed onto the code element. The coding of the code element (36) generates in the reflected light beam (44) sub-light beams having different optical path differences. This may be effected by stepped surface portions on the surface of the code element (36). The optical path differences are greater than the coherency length of the light of the light source (62). The reflected light beam is directed through a beam splitter (42) onto an interferometer for detection of the optical path differences. Interferences between sub-light beams are permitted by well-defined quick changes in the interferometer with determined path differences. Position signals can be obtained from the thus obtained "interference peaks".

16 Claims, 4 Drawing Sheets

OPTICAL POSITION TRANSMITTER HAVING A MOVABLE CODE ELEMENT WITH OPTICAL PATH DIFFERENCE GENERATING STRUCTURE WHICH IS GREATER THAN THE COHERENCE LENGTH OF THE SOURCE

TECHNICAL FIELD

The invention relates to an optical position transmitter, comprising (a) a movable code element provided with a coding, and (b) an optical scanning device for scanning the coding in which a light beam is directed onto the coding and, after having been influenced by the coding, is detected for generating a scanning signal.

It may relate to a rotary angle transmitter converting a rotation of the movable code element into a digital output signal. It may, however, also relate to a digital distance transmitter detecting a rectilinear movement and generating a corresponding digital signal. The rotary angle or distance transmitter may operate incrementally, i.e. generate with its movement a sequence of count signals counted by a counter. It must, however, be ensured that the counting is effected from a fixed reference position If the movable code element can move forwards and backwards, further formation of direction signals must be provided. The invention is, however, also applicable when the position of the movable code element is deposited absolutely in the form of a coding.

BACKGROUND ART

Incremental position signal transmitters are known, in which a rotatable circular disk has at its edge a track of radial lines scanned by photoelectric light barrier. The pulses obtained with a rotary motion of the disk are applied to a counter, the count of which provides a measure for the position of the disk. In order to obtain a directional signal, two traces with lines are provided, which are angularly offset by a quarter period and are scanned separately. Additionally, a reference mark is also scanned which provides a zero pulse, which resets the counter to zero. In order to achieve, on one hand, high resolution which requires a very fine division while obtaining, on the other hand, a useable change of light current providing a clean pulse, a stationary ruled grating of the same division is provided over the track with the lines. A light beam of finite cross section passes through the stationary ruled grating and the trace with the lines. The intensity of the light is alternatingly a maximum or a minimum, depending upon whether the lines of the trace overlap those of the ruled grating or are separated therewith (DE-AS 1 153 909, DE-A1-33 27849, DE-C2-20 02 583, EP-A2-0 184 628, EP-A2-0222 136).

In conventional position transmitters of this type the movable code element is scanned by light barriers. These light barriers provide electrical signals transmitted through electrical signal lines. Several signal lines are required for several signals. Such electrical signal lines are susceptible to trouble. In particular, electrical signal lines may be influenced by electromagnetic fields.

It is known to transmit optical signals in light piping fibers. The transmission of signals in light piping fibers offers the advantage that the optical signal transmission cannot be disturbed by external electromagnetic fields. It is also known to transmit several optical signals simultaneously in such a light piping fiber. In this case, the signals must be marked, for example, by different wavelengths of the light used for the signal transmission. This is expensive and cannot be effected in some applications.

Code disks are known, which comprise a pattern of dark opaque and of light transparent surface portions on several tracks, each track being scanned by a scanning head. The signals of the scanning heads then provide a digital value representing the angular position of the code disk. According to the prior art, such codings are also photoelectrically scanned by light barriers and transmitted as electrical signals for further processing. In this case a plurality of light barriers and a corresponding number of electrical signal lines are required.

DISCLOSURE OF INVENTION

It is the object of the invention to generate, in an optical position transmitter of the above-mentioned type, signals of sufficient amplitude at high resolution without additional stationary ruled gratings, namely, a pattern of parallel bars of the same pitch as that of the alternatingly opaque and transparent pattern on the edge of the coated element (rotary disc), which is not a diffraction grating.

It is a further object of the invention to transmit in a simple way, in an optical position transmitter of the above-mentioned type, several optical signals on one channel, e.g. by means of a single light piping fiber.

According to the invention, this object is achieved in that (c) the coding is formed to generate well-defined optical path differences within the light beam, and (d) the optical scanning device comprises an interferometer responding to the optical path differences.

The coding then causes a well-defined change of the optical path of the light beam, which may be converted into a change of light intensity by means of the interferometer. The coding is not effected by absorbing marks but in a reflecting or transmitting made by changes of the optical path. The movable code element to be scanned absorbs practically no light so that a very fine light beam with high energy density can be used for the scanning. Light beams having different optical path differences can be transmitted through one channel, e.g. a light piping fiber. The separation of the information is then effected by means of the interferometer.

It is advantageous, if (a) the light beam hits the movable code element in a luminous spot in the area of which the coding causes several different optical path differences in different superimposed sublight beams, with the intensities of the light with the different optical path differences in relation to each other depending on the position of the movable code element relative to the light beam, (b) the optical path differences generated by the coding are greater between said sub-light beams than the coherency length of the light of the light beam, and (c) the interferometer is arranged to generate additional optical path differences by which an interference between sub-light beams is caused.

Due to the coding, different optical path differences between the partial light beams occur in the interferometer light beam. The intensity of the single partial light beam depends on the position of the movable code element. As the coherency length of the partial light beams is smaller than the optical path differences caused by the coding, the partial light beams do not interfere. A further optical path difference is now introduced by the interferometer, which optical path difference causes an interference between the partial light beams. This interference converts the optical path differences into observable light intensities. The interference depends on the ratio of the intensities of the partial light beams to the changes as a function of the position of the movable code element to be scanned.

Then, different items of information can be transmitted on one channel, which items of information are marked by different optical path differences with respect to the incident light and are comprised of the intensities of the light marked by the respective optical path differences, which intensities are independent of the position. Thus, for example, count pulses and directional information can be transmitted simultaneously on one channel, or an interpolation between adjacent counts in an incremental position transmitter can be effected.

Further embodiments of the invention are subject matter of the sub-claims 4 to 15.

Some embodiments of the invention will now be described in greater detail with reference to the accompanying drawings.

BEST MODE OF CARRYING OUT THE INVENTION

Figure 1:
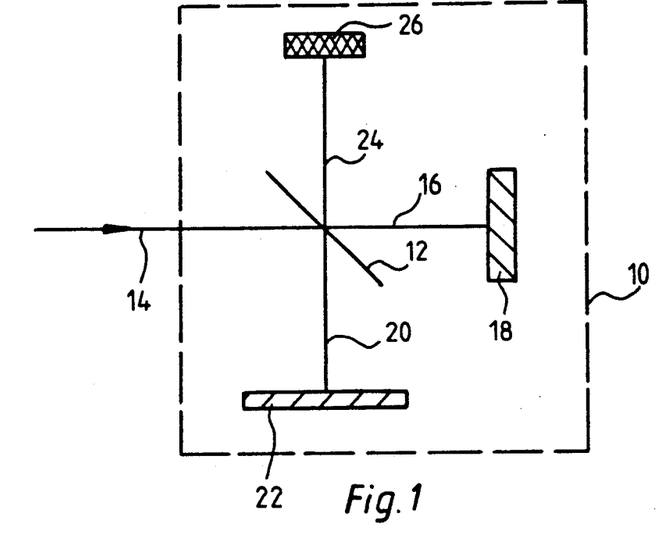
FIG. 1 shows schematically a first embodiment of the invention with a Michelson interferometer, in which the movable code element to be scanned is part of the interferometer.

In the embodiment of FIG. 1, the movable code element to be scanned is part of a Michelson interferometer generally designated by 10. The Michelson interferometer comprises a beam splitter 12. The beam splitter is arranged at an angle of 45° relative to an interferometer light beam 14. A partial light beam 16 passes from the interferometer light beam 14 through the beam splitter 12 and falls perpendicularly on a mirror 18. The mirror 18 reflects the partial light beam 16 in the direction of incidence. Another partial light beam 20 is guided by the beam splitter 12 onto the movable code element 22 to be scanned. The partial light beam 20 falls perpendicularly on the movable code element 22 and is also reflected thereby in the direction of incidence. The part of the reflected partial light beam 16 reflected at the beam splitter 12 and the part of the reflected partial light beam 20 transmitted by the beam splitter 12 are both superimposed onto a light beam 24. The light beam 24 falls onto a photoelectric detector 26. The movable code element 22 to be scanned, e.g. a rotatable disk of a rotary angle transmitter, is provided on its side facing the beam splitter 12 with a coding which influences the reflected partial light beam 20. This coding has the property that well-defined optical path differences of the light beam are generated. The Michelson interferometer responds to these optical path differences.

Figure 3:
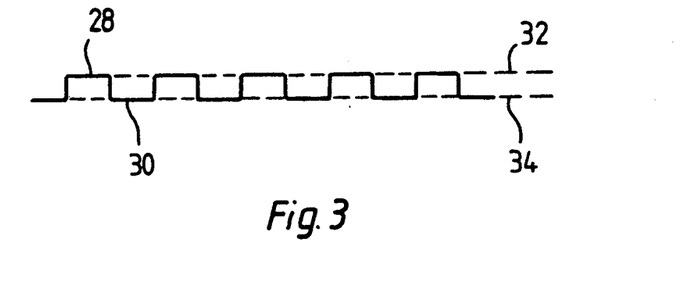
FIG. 3 shows schematically on a greatly enlarged scale the surface structure of the movable code element to be scanned in the simplest case of an incremental position transmitter with only one directional movement.

In FIG. 3, a possible surface structure of the movable code element 22 to be scanned is illustrated on a greatly enlarged scale. The coding is formed by differently deep, reflecting surface portions perpendicular to the incident light beam 20.

In the embodiment of FIG. 3, the surface portions 28 and 30 are alternatingly arranged in one of two parallel surfaces 32 and 34, respectively, the distance between which corresponds to said optical path differences.

The optical path differences generated by the coding are greater than the coherency length of the light of the light beam 14 and 20, respectively.

It is presumed that the optical path lengths of the partial light beams 16 and 20 from the beam splitter 12 to the mirror 18 and from the beam splitter 12 to the upper surface portion 28, respectively, differ within the range of the coherency length. Then, an interference between the partial light beams 16 and 20 is provided. The surface portion 28 thus generates an interference figure at the detector. When the partial light beam 20 impinges upon a surface portion 30, the optical path lengths of the partial light beams 16 and 20 differ by more than the coherency length. Both partial light beams cannot interfere any longer and no interference figure occurs at the detector 26. Thus, with the movement of the code element 22 passing the partial light beam 20, interference figures and no interference figures occur alternatingly at the detector 26.

Figure 2:
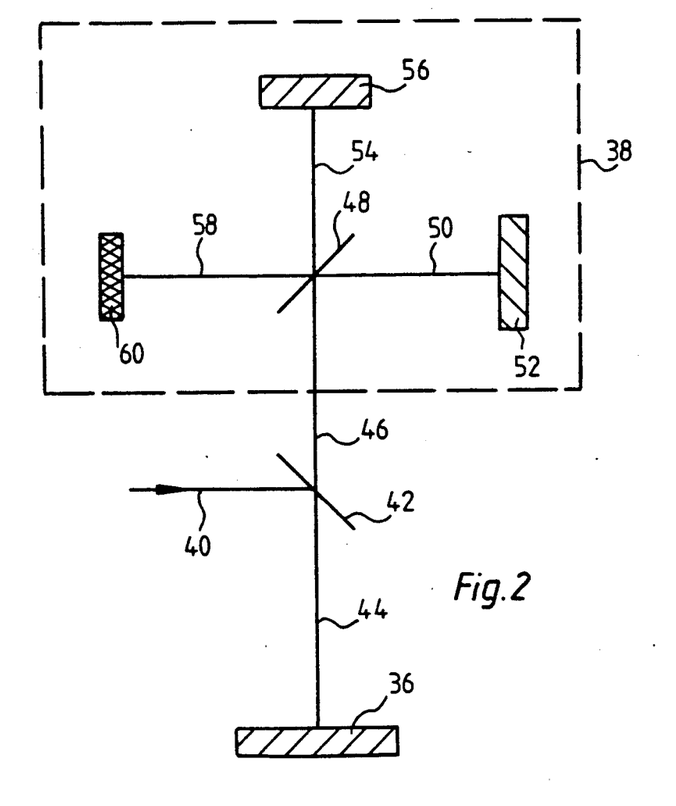
FIG. 2 shows schematically a second embodiment of the invention with a Michelson interferometer, in which the movable code element to be scanned is not part of the Michelson interferometer.

The described method would necessitate a very exact positioning of the mirror 18 and of the movable code element 22. In order to avoid this necessity, the mirror 18 may be reciprocated by a piezoelectrical oscillator, for example, in the direction of the partial light beam 16. The frequency of this movement must be greater than the frequency of the signals to be counted. The amplitude of the movement must be greater than the optical path difference generated by the coding. When scanning the surface portions 28, a sequency of interference peaks then occurs, i.e. a peak occurs when the optical path difference of the interfering partial light beams 16 and 20 is within the coherency length. When scanning the surface portion 30, no interference peaks occur because the difference of the optical path lengths of the partial light beams is greater than the coherency length of the used light. FIG. 2 shows another embodiment of a position transmitter.

A movable code element to be scanned, e.g. a rotatable disk of a rotary angle transmitter, is designated in FIG. 2 by 36. An interferometer is provided for scanning a mark provided on the movable code element. Contrary to the embodiment of FIG. 1, in FIG. 2 the movable code element 36 is not part of the interferometer 38.

A light beam 40 falls on a first beam splitter 42 arranged at 45° relative to the light beam 40 and deviating the light beam 40 downwards in FIG. 2. The deviated light beam 44 falls perpendicularly on the movable code element 36 to be scanned and is reflected thereby in the direction of incidence. The reflected light beam 44 partially passes through the beam splitter 42 and reaches as interferometer light beam 46 the interferometer 38.

The interferometer light beam 46 falls on a beam splitter 48. The beam splitter 48 is arranged at 45° relative to the interferometer light beam 46. The beam splitter 48 deviates a first partial light beam 50 to a first mirror 52. The partial light beam 50 falls perpendicularly on the mirror 52 and is reflected thereby in the direction of incidence. A second partial light beam 54 passes through the beam splitter 48 and impinges perpendicularly upon a second mirror 56. The second mirror 56 reflects the partial light beam 54 in the direction of incidence.

The partial light beam 50 reflected by the first mirror 52 partially passes through the beam splitter 48. The partial light beam reflected by the second mirror 56 is partially reflected by the beam splitter 48. The part of the partial light beam 50 passing through the beam splitter 48 and the part of the partial light beam 54 reflected at the beam splitter 48 are both superimposed onto a light beam 58. The light beam 58 falls on a photoelectrical detector 60.

It is presumed that the movable code element 36 has once again alternatingly upper and lower surface portions 28 and 30, respectively, as is illustrated in FIG. 3. The double depth of the surface portion 30 as compared to the surface portion 28 is again greater than the coherency length of the used light. The two arms of the interferometer, i.e. the optical path lengths between the beam splitter 48 and the two mirrors differ by this amount. It is presumed that the optical path length of the partial light beam 50 is shorter than the optical path length of the partial light beam 54. If the advancing light beam 44 only falls on one surface portion 30, no interference of the two partial light beams falling on the detector 60 and superimposed onto the light beam 58 is provided. The optical path difference, i.e. the difference of the optical paths of the two partial light beams 50 and 54, is greater than the coherency length. If, however, the light beam 44 falls partially on a surface portion 28 and partially on a surface portion 30, then the two partial light beams 50 and 54 are again subdivided into two "sub-light beams" each, one of which has been reflected at a surface portion 28 and the other one at a surface portion 30.

If s designates the optical path difference between the surface portions 28 and 30 and also between the optical path lengths of the partial light beams 50 and 54, with the optical path length of the sub-light beam reflected at the surface portion 28 and the mirror 56 being considered as reference, then the sub-light beam of the partial light beam 50 which is reflected at the surface portion 28 and at the mirror 52 has a optical path difference of −s, as the optical path length of the partial light beam 50 is shorter about s than the optical path length of the partial light beam 54. The sub-light beam of the light beam 54 which is reflected at the surface portion 30 and at the mirror 56 has an optical path difference of +s, as the optical path length of the light beam 44 to the surface portion 30 is longer by s than the optical path length of the light beam 44 to the surface portion 28. No one of these three sub-light beams interferes with another one, as the optical path differences are greater than the coherency lengths. The sub-light beam of the partial light beam 50 which is reflected at the surface portion 30 and at the mirror 52 has, however, as compared to the sub-light beam of the partial light beam 54 which is reflected at the surface portion 28 and at the mirror 56, an optical path difference +s −s =0. The increased optical path length of the light beam 54 is compensated for by the shortened optical path length of the partial light beam 50. These two sub-light beams may thus interfere. The interference is the greatest when the intensity of the two "sub-light beams" are the same, i.e. when the light beam 54 stands half on a surface portion 28 and half on a surface portion 30.

Figure 6:
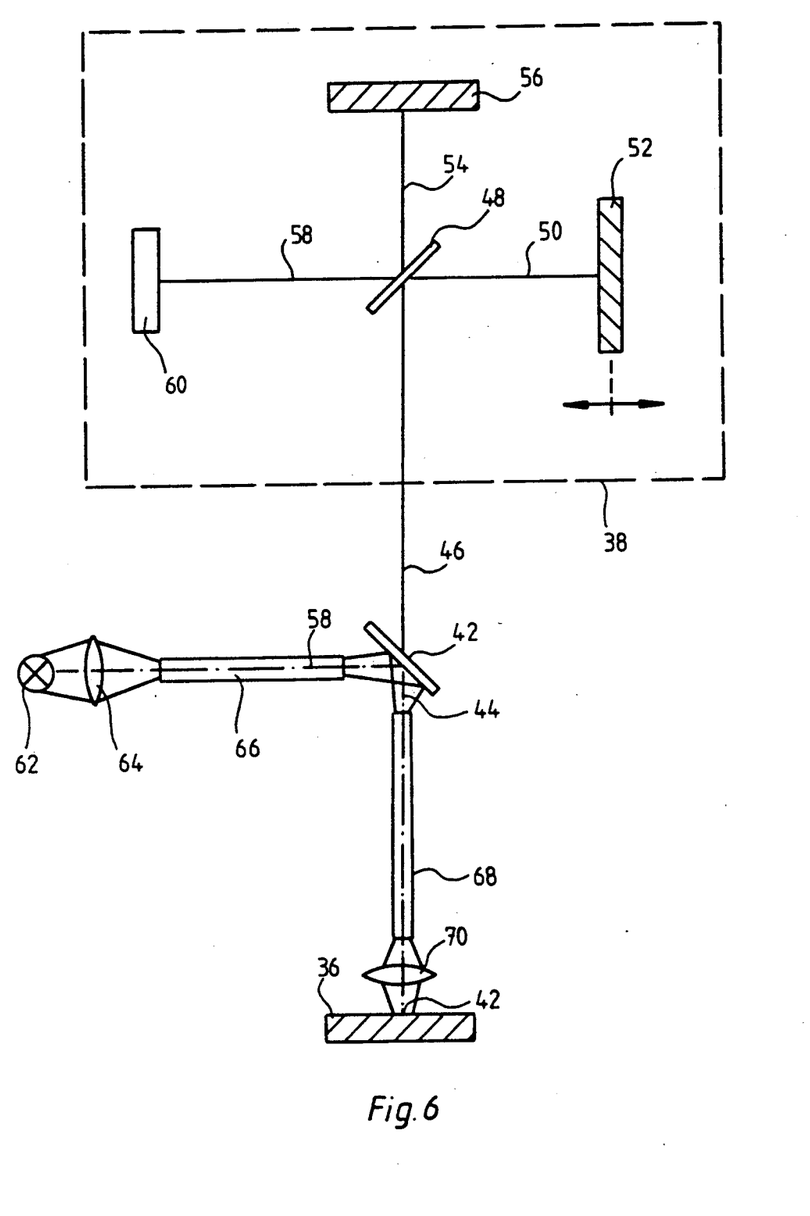
FIG. 6 shows a third embodiment, similar to FIG. 2, of an optical position transmitter.

FIG. 6 shows an arrangement which is constructed similarly to the arrangement of FIG. 2. Corresponding elements are designated in FIG. 6 by the same numerals as used in FIG. 2. In the arrangement of FIG. 6, the light beam 40 is directed from a light source 62 through an imaging optical system 64 onto the end face of a light pipe 66, for example a light piping fiber, and is piped by the light pipe 66 to the beam splitter 42. The light beam 44 reflected at the beam splitter 42 is piped through a light pipe 68 to the movable code element 36 to be scanned. An imaging optical system 70 generates a luminous spot on the code element 36. This is illustrated schematically in FIG. 7 on an enlarged scale.

The reflected light beam 44 passes partially through the beam splitter 42 and falls as interferometer light beam 46 on the interferometer 38.

Figure 4:
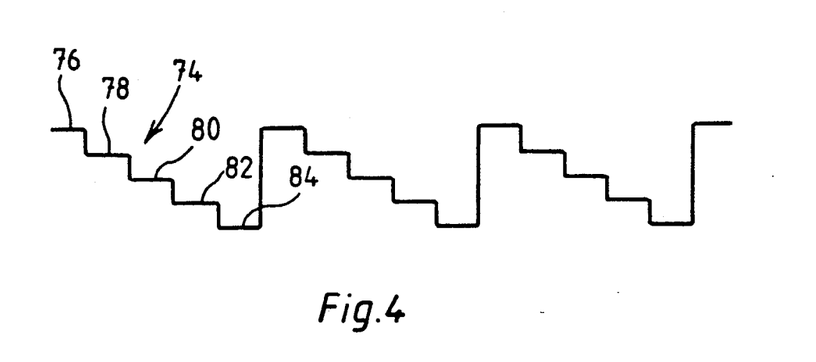
FIG. 4 shows schematically on a greatly enlarged scale the surface structure of a movable code element which will be scanned according to the directional movement.

The reflecting surface of the code element 36 has periodical sequences 74 of several stepwisely-arranged surface portions 76, 78, 80, 82 and 84. This is illustrated in FIG. 4 in a greatly exaggerated way and indicated in FIG. 7. The surface portions 76, 78, 80, 82 and 84 are located in equidistant surfaces, such that steps of the same height result.

As it is indicated in FIG. 6 by a double arrow 86, the mirror 52 can be reciprocated in the direction of the partial light beam. This movement is effected through a distance corresponding to the double depth of the surface portion 84 as compared to the surface portion 76. The steps are again greater than the coherency length of the used light. The luminous spot 72 generated by the imaging optical system 70 is smaller than the dimensions of one of the said periodical sequences 74, as may be seen from FIG. 7.

Figure 7:
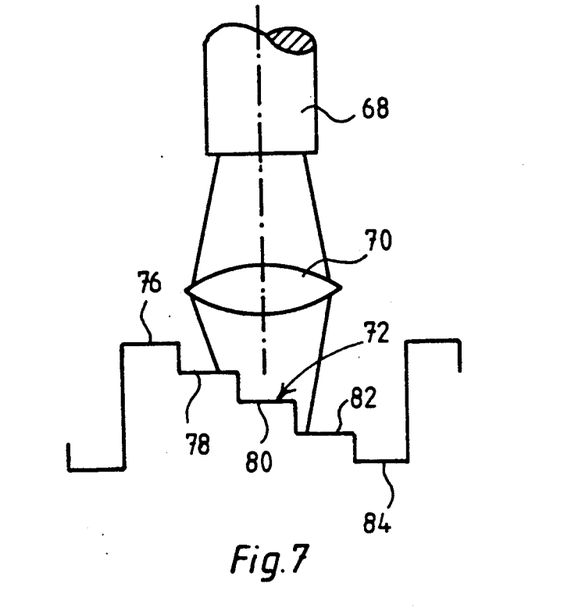
FIG. 7 shows schematically and on a greatly enlarged scale the light beam and the surface structure of the movable code element to be scanned.

The described arrangement operates as follows:

The luminous spot 72 covers in the illustrated position three surface portions 78, 80 and 82 of a sequence 74. Each partial light beam 50 and 54 thus comprises three "sub-light beams", which have been reflected at the surface portions 78, 80 and 82, respectively. The sub-light beams reflected at the surface portions 78, 80 and 82 have optical path differences of s, 2s and 3s, respectively, with respect to the surface portion 76, with s being the double step height. The optical path difference s is greater than the coherency length of the light, such that the sub-light beams in the interferometer light beam 46 do not interfere.

When the optical path lengths of the two partial light beams 50 and 54 from the beam splitter 48 to the mirror 52 and 56, respectively, and back differ only by half a path length of the used light or by an odd multiple of half a wave length, a light extinguishing by interference in each "sub-light beam" occurs. Correspondingly, a light intensification is provided, when the optical path lengths of the sub-light beams 50 and 54 are equal or differ by one complete wave length of the used light. When the mirror 52 is moved about the ∓zero point", which is determined by the equality of the optical path lengths of the partial light beams 50 and 54, the intensity course illustrated in FIG. 8 at 87 results at the detector 60 as a function of the control path of the mirror 52.

When the mirror 52 moves from this position in the direction of the partial light beam 50 further towards the left, the optical path length of the partial light beam 50 is then correspondingly shortened. When the shortening of the optical path length of the partial light beam 50 has reached the double step height, i.e. the value s, then an interference is provided between the sub-light beams of the light beam 50, which is reflected at the surface portion 80 and at the mirror 52, and the sub-light beam of the partial light beam 54, which is reflected at the surface portion 78 and at the mirror 56, in a similar fashion to what has already been described above in connection with FIG. 2 and 3. Also, an interference is provided between the sub-light beam of the partial light beam 50, which is reflected at the surface portion 82 and at the mirror 50, and the sub-light beam of the partial light beam 54, which is reflected at the surface portion 80 and at the mirror 56. When the mirror 52 is moved about this position, constructive and destructive interference is thus provided, and the intensity course illustrated in FIG. 8 at 88 results at the detector 60.

Figure 8:
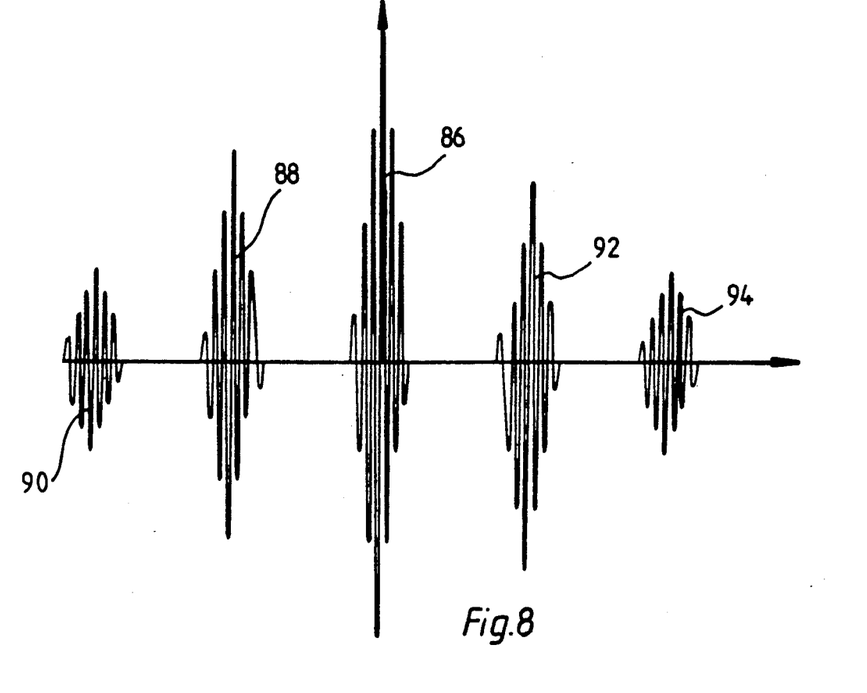
FIG. 8 shows schematically signals as occurring in an optical position transmitter of FIG. 6.

When the mirror 52 is moved further to the left, the interference between the above-mentioned sub-light beams stops because the optical path lengths, e.g. between the sub-light beam of the partial light beam 50 which is reflected at the surface portion 80 and the mirror 50, becomes smaller by more than the coherency length than does the optical path length of the sub-light beam of the partial light beam 54 which is reflected at the surface portion 76 and the mirror 56.

When the mirror 52 is moved further to the left in FIG. 6, when the optical path length of the partial light beam 50 is shortened by the value 2s, an interference is provided between the sub-light beam of the partial light beam 54 which is reflected at the surface portion 78 and at the mirror 56, and the sub-light beam of the partial light beam 50 which is reflected at the surface portion 82 and at the mirror 52. The different orders of the interference provide an intensity course as a function of the displacment of the mirror 52, as is illustrated in FIG. 8 at 90.

Similar intensity courses result when the mirror is moved from the zero position to the right in FIG. 6. With a displacement of the mirror 52 of -s, an interference results between the sub-light beam of the partial light beam 54 which is reflected at the suface portion 80 and at the mirror 56, and the sub-light beam of the partial light beam 50, which is reflected at the surface portion 78 and at the mirror 52. With this position of the mirror 52 an interference also results between the sub-light beam of the partial light beam 54, which is reflected at the surface portion 82 and at the mirror 56 and the sub-light beam of the partial light beam 50, which is reflected at the surface portion 80 and at the mirror 52. With the interferences of the different orders this results in an intensity course as is illustrated in FIG. 8 at 92.

Correspondingly, an intensity course 94 similar to the intensity course 90 results with the position −2s of the mirror 52.

When the movable code element 36 is moved relative to the luminous spot 72, the lateral ∓interference peaks" 88, 90, 92 and 94 carry out pulsations, which may be used for generating counting pulses. Each pulsation and therewith each counting pulse corresponds to a step of the periodical sequence 74. Thus, a high resolution is achieved without the luminous spot 72 having to be correspondingly fine. The scanning by reciprocating motion of the mirror 52 must, of course, be effected with a high frequency as compared to the frequency of the counting pulses.

Figure 5:
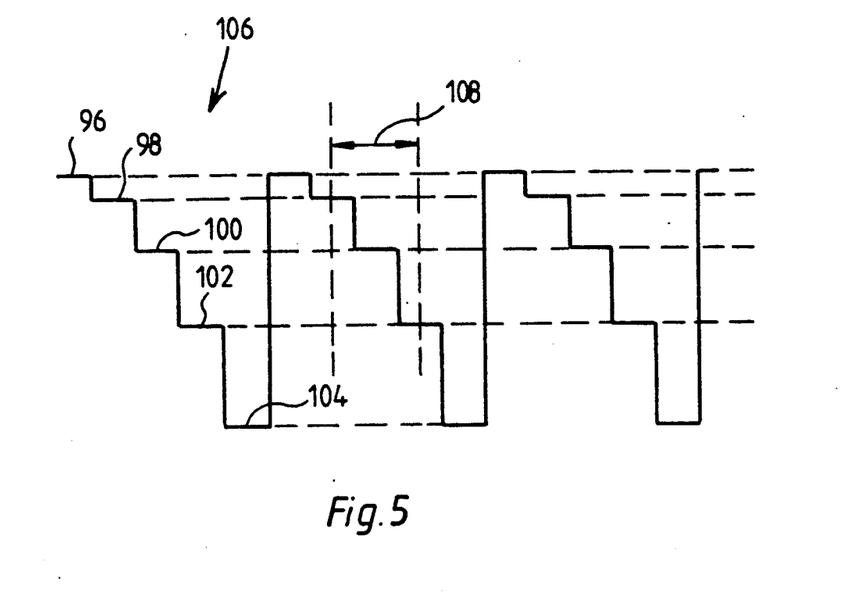
FIG. 5 shows another embodiment of the surface structure of a movable code element which will be scanned according to the directional movement.

The sequence of surface portions may also be formed such as illustrated in FIG. 5.

In the embodiment of FIG. 5, the surface portions 96, 98, 100 and 104 of each sequence 106 are again located in different surfaces indicated by dotted lines. These surfaces are, however, not equidistant. Thereby the optical path differences of the sub-light beams reflected at the different surface portions are different. Accordinly what results is as follows:

It is presumed that a luminous spot 108 includes in a certain position of the movable code element to be scanned, a part of the surface portions 98, the surface portion 100 and a part of the surface portion 102. This is indicated in FIG. 5 by dotted vertical lines. Then the same situation as described above in connection with FIG. 4 and 7 results in the ∓zero position" of the mirror 52. The partial light beams 50 and 54 interfere, regardless of whether a sub-light beam has been reflected at the surface portion 98, the surface portion 100 or the surface portion 102. An intensity course depending on the path of the mirror 52, corresponding to curve 86 of FIG. 8, results at the detector.

When the mirror 52 moves from the zero position to the left beyond the coherency length, no interference is provided any longer between the light, which has been reflected at one and the same surface portion and directed through the beam splitter into the partial light beams 50 and 54. When the mirror 52 has passed a distance corresponding to the height of the step between the surface portions 98 and 100, then the sub-light beam reflected at the surface portion 98 and the mirror 56 interferes with the sub-light beam reflected at the surface portion 100 and at the mirror 52. This interference provides an intensity course similar to curve 88 in FIG. 8. However, this intensity curve does not include, contrary to FIG. 8, an interference between the sub-light beams reflected at the surface portion 100 and at the mirror 56 and at the surface portion 102 and at the mirror 52, respectively.

When the mirror 52 is moved further into a position corresponding to the step between the surface portions 100 and 102, an interference is provided between the sub-light beam reflected at the surface portion 100 and at the mirror 56 and the sub-light beam reflected at the surface portion 102 and at the mirror 52. Also, here, an intensity course similar to curve 88 in FIG. 8 results, which, however, again does not include the interference of the sub-light beams reflected at the surface portion 98 and 100. The ∓interference peak" 88 in FIG. 8 is split into two interference peaks at the location of the respective step heights.

A third interference peak occurs with a path of the mirror 52 corresponding to the sum of the double steps or to the double height distance between the surface portion 98 and 102. Corresponding interference peaks occur when the mirror 52 is moved to the right from the zero position.

When the luminous spot 108 moves with respect to the code element 36 (or inversely), then the heights of the interference peaks change in a characteristic manner: When the luminous spot 108 moves from the direction indicated in FIG. 5 to the right in FIG. 5, the interference peak caused by the sub-light beams reflected at the surface portions 98 and 100 becomes smaller and finally disappears, because the intensity of the sub-light beam reflected at the surface portion 98 becomes smaller. On the other hand, the other interference peak caused by the interference of the sub-light beams reflected at the surface portions 100 and 102 becomes greater because the intensity of the sub-light beam reflected at the surface portion 102 becomes greater as the luminous spot 108 covers more of the surface portion 102.

When the luminous spot 108 is moved to the left in FIG. 5 (or with an inverse movement of the code element 36), the situation is reversed: the interference peak caused by the sub-light beams reflected at the surface portions 98 and 100 increases, and the interference peak caused by the sub-light beams reflected at the surface portions 100 and 102 decreases.

Thus, the direction of motion can be inferred from the obtained signals.

When the luminous spot leaves the surface portion 98 completely and covers the surface portion 102 with the adjacent surface portions 100 and 104, two interference peaks occur at locations corresponding to the heights of the steps between the surface portions 100 and 102 and the surface portions 102 and 104, respectively. The interference peaks at the location corresponding to the height of the step between the surface portions 98 and 100 disappear.

Thus, not only can a directional signal be derived from the thus obtained signals but an additional signal can also be derived for the range of the respective sequence 106, in which is located the luminous spot 108. Finally, the ratio of the heights of the interference peaks permits an interpolation between the divisions determined by the surface portions 98 to 104.

The movable code element to be scanned may also be scanned in transmission. The stepped surface portions may then be replaced by surface portions having different refractive indices.

Position transmitters of the described type are very versatile in their application, for example, in the automatic control engineering for determining the position of machine elements or control elements.

We claim:
1. An optical position transmitter comprising
   (a) a movable code element having a code track thereon, said code track comprising a pattern of optical path difference generating structure arranged to provide in a light beam impinging thereon, differences in optical path length of partial light beams falling on different elements of said pattern,
   (b) an optical scanning device for scanning said code track, said optical scanning device including
      light source means, emitting light the coherence length of which is smaller than the optical path differences generated by said optical path difference generating means between said partial light beams,
      means for directing a light beam from said light source means onto said pattern of optical path difference generating structure of said code track, whereby a modified beam with more than one partial beam with an optical path difference therebetween are provided, and
      an interferometer having photoelectric detector means and two optical paths of different lengths which receives aid modified beam, said interferometer responding to said path differences by providing optical interferences of said partial light beams as a function of said pattern, whereby said photoelectric detector means generate signals indicative of the movement of said code element.

2. Optical position transmitter as set forth in claim 1, characterized in that
   (a) the light beam (44) hits the movable code element (36) in a luminous spot in the area of which the coding causes several different optical path differences in different superimposed sub-light beams, with the intensities of the light with the different optical path differences in relation to each other depending on the position of the movable code element (36) relative to the light beam (44),
   (b) the optical path differences generated by the coding are greater between said sub-light beams than the coherency length of the light of the light beam (44), and
   (c) the interferometer (38) is arranged to generate additional optical path differences by which an interference between sub-light beams is caused.

3. Optical position transmitter as set forth in claim 1, characterized in that the interferometer (38) is a Michelson interferometer, in which an interferometer light beam (46) is split by a beam splitter (48) into two partial light beams (50,54), which are returned into themselves by two reflecting coding splitters (52,56), and are caused to provide interference through the beam splitter (48) in the plane of a detector (60).

4. Optical position transmitter as set forth in claim 1, characterized in that the interferometer is a Mach-Zehnder interferometer.

5. Optical position transmitter as set forth in claim 1, characterized in that the interferometer is a Jamin interferometer.

6. Optical position transmitter as set forth in claim 3, characterized in that the movable code element (22) to be scanned forms one of said reflecting coding splitters of the interferometer (10).

7. Optical position transmitter as set forth in claim 3, characterized in that
   (a) the reflecting coding splitters are formed by one mirror (52,56) each,
   (b) a light beam (40) is deviated through a second beam splitter (42) onto the the movable code element (36) to be scanned, and
   (c) is reflected thereby through the beam splitter (42) as interferometer light beam (46) on the beam splitter (48) of the interferometer (38).

8. Optical position transmitter as set forth in claim 7, characterized in that one of the reflecting coding splitters (52) of the interferometer (38) is arranged to periodically reciprocate in the direction of the partial light beam (50).

9. Optical position transmitter as set forth in claim 8, characterized in that the light beam (44) is piped from the second beam splitter (42) to the movable code element (36) to be scanned through a light pipe (68).

10. Optical position transmitter as set forth in claim 9, characterized in that the light beam (40) is piped to the second beam splitter (42) through a light pipe (66).

11. Optical position transmitter as set forth in claim 1, characterized in that the coding is formed by differently deep reflecting surface portions (28,30; 76 to 84; 96 to 104) perpendicular to the incident light beam (44).

12. Optical position transmitter as set forth in claim 11, characterized in that the surface portions (28,30) are arranged alternatingly in one of two parallel surfaces, the distance between which corresponds to said optical path difference.

13. Optical position transmitter as set forth in claim 11, characterized in that the movable code element (36) to be scanned has periodical sequences (74,106) of several stepwise-arranged surface portions.

14. Optical position transmitter as set forth in claim 13, characterized in that the surface portions (76 to 84) are located in equidistant surfaces.

15. Optical position transmitter as set forth in claim 13, characterized in that the surface portions (96 to 104) are located in non-equidistant surfaces.

16. Optical position transmitter as set forth in claim 1, characterized in that the movable code element to be scanned is arranged to be scanned in transmission and the optical path differences are generated by surface portions having different refractive indices.

* * * * *